Patented June 19, 1951

2,557,560

UNITED STATES PATENT OFFICE

2,557,560

DIAMINO AND SUBSTITUTED DIAMINO TETRAHYDROXY CYCLOHEXANES

Robert L. Peck, Plainfield, N. J., assignor to Merck & Co., Inc., Rahway, N. J., a corporation of New Jersey No Drawing. Application February 26, 1946, Serial No. 650,392

10 Claims. (Cl. 260—553)

This application is a continuation-in-part of my pending application Serial No. 624,333, filed October 24, 1945, now abandoned.

This invention relates to cyclohexane compounds, and particularly to tetrahydroxy cyclohexanes having two amino, carbamido, or guanido substituents in the cyclohexane ring, and to acid salts and acyl derivatives of such cyclohexanes. These substances have antibacterial properties and are also useful as intermediates in the preparation of antibiotics active against organisms such as *E. typhi, Brucella abortus, Salmonella schottmüllerei, Bacillus tularensis, Bacillus mycoides, Bacillus cereus, Pseudomonas aeroginosa, Pseudomonas fluorescens*, and *Serratia marcescens*.

The primary new substances embodied in the present invention can be classified as 2,4,5,6-tetrahydroxy-1,3-disubstituted cyclohexanes of the strucural formula

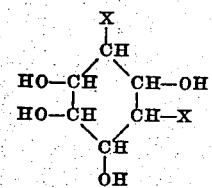

wherein the substituents X are the same and of the class consisting of —NH$_2$,

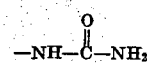

and

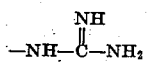

To simplify reference to these primary substances and their acid salts and acyl derivatives the primary substances have been assigned names which will be used hereinafter in the specification and claims. Streptamine is the diamino tetrahydroxy cyclohexane; strepturea is the dicarbamido tetrahydroxy cyclohexane; and streptidine is the diguanido tetrahydroxy cyclohexane. These names have been selected partly upon the basis of relationship of the substances with streptomycin as hereinafter described and partly upon the basis of the characteristic disubstituents in each substance.

Streptidine is a strongly basic substance forming crystalline acid salts and acyl derivatives. It can be prepared from substantially pure streptomycin hydrochloride, such as streptomycin hydrochloride purified by selective adsorption and elution as fully disclosed in applicant's pending application Serial No. 601,337, filed June 23, 1945, or obtained by regeneration of the helianthine salt of streptomycin described in a publication by Kuehl, Peck, Walti, and Folkers in Science 102, 34–35 (July 13, 1945).

It has been discovered in accordance with the present invention that when streptomycin hydrochloride is treated with a mineral acid such as hydrochloric acid, sulfuric acid, and the like in aqueous lower aliphatic alcohol, or mixed aqueous-lower aliphatic alcohol solution, there is a cleavage of the streptomycin molecule resulting in the formation of the corresponding mineral acid salt of streptidine. As streptidine is relatively thermostable the reaction can be carried out at elevated temperature, for example, by heating the reaction mixture at about 120° C., under pressure, for about two hours; however, it will also be understood that the reaction can be carried out at room temperature by allowing the reaction mixture to stand for about 18–20 hours. Streptidine is recovered from the reaction mixture in the form of a readily crystallizable salt such as the picrate salt in the manner fully set forth in the examples; and from the crystalline product thus obtained other organic and inorganic acid salts as well as acyl derivatives are obtained as described in the examples. It will be noted, however, that when streptomycin hydrochloride is reacted with concentrated sulfuric acid in absolute methanol, the sulfate of streptidine separates directly in crystalline form.

When streptidine in the form of an acid salt such as its hydrochloride is hydrolyzed by heating for about one hour in dilute aqueous alkali, preferably in an oxygen free (nitrogen) atmosphere, it is converted to strepturea, which is recovered as a crystalline product.

Prolonged alkaline hydrolysis of either streptidine or strepturea in an oxygen free (nitrogen) atmosphere yields streptamine. As the reaction is brought about by the OH$^-$ ion in solution, it is preferable to use the alkali in dilute solution although solutions containing up to about 30% sodium hydroxide have been used successfully. It will be understood in this connection that any alkali metal or alkaline earth metal hydroxide in aqueous solution can be used for this hydrolysis. Streptamine is formed in the hydrolysis solution as the free base, and upon neutralization of the excess alkali it can be recovered as such, or preferably as a streptamine acid salt such as the crystalline streptamine sulfate. Streptamine sulfate can in turn be converted to other inorganic or organic acid salts, acyl derivatives, or free base by procedures fully set forth in the examples.

The following examples illustrate methods of carrying out the present invention, but it is to be understood that these examples are given by way of illustration and not of limitation.

EXAMPLE I

*Streptidine picrate*

About 320 mg. of streptomycin hydrochloride regenerated from pure streptomycin helianthate is dissolved in about 2 cc. of water and 1.0 cc. of concentrated hydrochloric acid. The solution is heated in a sealed ampoule at 120° for 2 hours. The hydrolysis mixture is then evaporated to dryness, dissolved in methanol, filtered through activated charcoal, and again evaporated to dryness. The residue, about 178 mg., is separated into an ethanol-soluble fraction, about 89 mg. The ethanol-soluble fraction is dissolved in about 15 cc. of water, about 118 mg. of picric acid (containing 10% moisture) is added, and solution is effected by heating. On cooling, long needle crystals separate. After recrystallization according to conventional methods, the crystals melt at about 283–284° (micro-block) with decomposition. Polarographic analysis shows the presence of 61.1% picric acid. The elementary analyses of a sample dried at 25° in vacuo agree with the formula $C_8H_{18}N_6O_4.2C_6H_3N_3O_7.2H_2O$: Calcd.: C, 31.75; H, 3.73; N, 22.22. Found C, 31.65, 31.96; H, 3.47, 3.61; N, 22.01. Analyses on a sample dried at 56° in vacuo agree with the formula of the anhydrous streptidine picrate, $C_8H_{18}N_6O_4.2C_6H_3N_3O_7$. Calcd.: C, 33.34; H, 3.36; N, 23.33. Found: C, 33.21; H, 3.03; N, 22.75.

A sample of streptidine picrate crystallized from water as the dihydrate was recrystallized from methanol-ether giving an anhydrous product, M. P. about 280–281° (micro-block) with decomposition.

Anal. Calcd. for $C_{20}H_{24}N_{12}O_{18}$: C, 33.34; H, 3.36; N, 23.33. Found: C, 33.57; H, 3.55; N, 22.93.

EXAMPLE II

*Streptidine hydrochloride*

About 234 mg. of streptidine picrate was suspended in 3 cc. of methanol and 0.1 cc. of concentrated hydrochloric acid was added causing solution to occur. Addition of about 25 cc. of acetone caused the separation of a white precipitate which was washed with acetone and dried, giving 112 mg. of dry powder. This appears to be a dihydrochloride. It melts at about 170–210° (micro-block) with decomposition. The material is hygroscopic and is dried at 100° in vacuo for analysis.

Anal. Calcd. for $C_8H_{18}N_6O_4.2HCl$: C, 28.66; H, 6.01; N, 25.07. Found: C, 29.31; H, 6.57; N, 25.16.

The dihydrochloride, about 26 mg., on treatment with excess diazomethane in methanol solution yields a crystalline product on addition of ether. The yield is about 12 mg. of small needles. The crystals melt to a viscous syrup at about 158–160° (micro-block), and give off gas up to 200°. This appears to be streptidine monohydrochloride.

Anal. Calcd. for $C_8H_{18}N_6O_4.HCl$: C, 32.16; H, 6.41; N, 28.13. Found: C, 31.88; H, 6.69; N, 25.20.

EXAMPLE III

*Streptidine helianthate*

A hot solution of about 1 g. of methyl orange in 70 cc. of water is added to a solution of about 421 mg. of streptidine hydrochloride in 5 cc. of methanol. A voluminous, finely crystalline, orange-brown precipitate separates. This, after collection by centrifugation, is recrystallized from aqueous methanol. A yield of about 1.1 grams of streptidine helianthate is obtained. The crystals sinter at about 225°, and melt at about 246–250° (micro-block) with decomposition.

A sample dried at 56° in vacuo gave the following analytical results: Calcd. for $$C_{36}H_{48}N_{12}O_{10}S_2.2H_2O$$

C, 47.57, H, 5.77. Found: C, 47.25; H, 5.60. A sample dried at 100° in vacuo gave the following results: Calcd. for $C_{36}H_{48}N_{12}O_{10}S_2$: C, 49.53; H, 5.54. Found: C, 49.31; H, 5.30.

EXAMPLE IV

*Streptidine d-camphorsulfonate*

About 1.048 g. of streptidine hydrochloride is dissolved in 3 cc. of methanol. Slightly more than the equivalent amount of sodium d-camphorsulfonate, about 1.6 g., dissolved in 3 cc. of methanol is added. On standing, sodium chloride separates and is filtered off. The filtrate is diluted with about 10 cc. of absolute ethanol, whereupon a voluminous precipitate of white needles separates. The yield in the first crop is about 1.49 g. The recrystallization of streptidine d-camphorsulfonate is carried out in 50% methanol-ethanol, and gives needles melting at about 185–188° (micro-block).

Analysis of a sample dried at 56° in vacuo gave the following values: Calcd. for $$C_8H_{18}N_6O_4.2C_{10}H_{16}O_4S \cdot H_2O$$

C, 45.15; H, 7.04; N, 11.28. Found: C, 45.42; H, 7.10; N, 11.41. Analyses of the same sample dried at 100° in vacuo gave the following values: Calcd: for $C_8H_{18}N_6O_4 \cdot 2C_{10}H_{16}O_4S$: C, 46.27; H, 6.93. Found: C, 46.25; H, 6.52.

EXAMPLE V

*Streptidine chloroplatinate*

About 21 mg. of streptidine hydrochloride is dissolved in 0.5 cc. of water and mixed with 1.0 cc. of a 10% aqueous solution of chloroplatinic acid. The clear solution is diluted to about 12 cc. with absolute ethanol and allowed to stand for some time in the cold room. Orange-yellow crystals are deposited which after drying weigh about 32 mg. These crystals begin to decompose at about 231° (micro-block). The crystals formed in the above manner appear to be pure streptidine chloroplatinate as is shown by elementary analyses obtained on such preparations.

Anal. Calcd. for $C_8H_{18}N_6O_4.H_2PtCl_6$: C, 14.29; H, 3.00; N, 12.50; Pt, 29.04. Found: C, 14.38; H, 3.08; N, 11.97; Pt, 28.82.

EXAMPLE VI

*Octaacetyl streptidine*

About 1.01 g. of streptidine hydrochloride, about 494 mg. of fused sodium acetate, and 20 cc. of acetic anhydride are refluxed together for one hour. The acetylation mixture is concentrated to dryness in vacuo. To the solid residue water is added and the insoluble crystalline acetyl derivative is filtered off and dried giving about 152 g. of needle crystals. The crystalline product is recrystallized from chloroform-petroleum ether mixture giving about 1.22 g. of needle crystals melting at about 260° (micro-block).

Analyses of typical preparations are as follows: Calcd. for $C_{24}H_{34}N_6O_{12}$: C, 48.15; H, 5.73; N, 14.04; acetyl, 57.52. Found: (1) C, 48.39; H, 5.09; N, 13.72. (2) C, 48.20; H, 5.73; N, 13.75; acetyl, 59.2. (3) C, 48.40; H, 5.73; N, 14.84; acetyl, 57.0.

Ultraviolet absorption spectrum determination showed a maximum at about 2200 Å., 1%=about 400, a maximum at about 2525 Å., 1%=about 630, and a minimum at about 2335 Å., 1%= about 295.

EXAMPLE VII

Streptidine dihydroiodide

About 304 mg. of octaacetyl streptidine, 150 mg. of red phosphorus, 576 mg. of iodine, and 5 cc. of hydriodic acid, sp. g. 1.7, are mixed in a bomb tube and heated at 160–190° for about 7 hours. The tube is opened and the contents diluted with water and filtered. The filtrate is evaporated to dryness leaving a semi-crystalline residue. This is dissolved in methanol; addition of ether causes the separation of white crystals of streptidine dihydroiodide. A sample was analyzed, giving the following results.

Anal. Calcd. for $C_8H_{18}N_6O_4 \cdot 2HI$: C, 18.54; H, 3.89; N, 16.22; I, 48.99. Found: C, 19.43; H, 3.96; N, 15.75; I, 48.52.

EXAMPLE VIII

Streptidine sulfate

About 1 g. of streptidine picrate was dissolved in 50 cc. of methanol and excess concentrated sulfuric acid, 1.0 cc., was added. White needle crystals separated on standing for a short time. These crystals appear to contain one mole of methanol of crystallization.

Anal. Calcd. for $C_8H_{18}N_6O_4 \cdot H_2SO_4 \cdot CH_3OH$: C, 27.55; H, 6.17; N, 21.42. Found: C, 27.78; H, 5.47; N, 21.49.

The crystals are recrystallized from water containing excess sulfuric acid by addition of acetone, and give the alcohol-free streptidine sulfate. The yield of three-times recrystallized product is about 300 mg. A sample was dried at 100° in vacuo for analysis.

Anal. Calcd. for $C_8H_{18}N_6O_4 \cdot H_2SO_4$: C, 26.66; H, 5.60; N, 23.33. Found: C, 26.91; H, 5.66; N, 23.20.

Streptidine sulfate exhibits no melting point below 300°.

EXAMPLE IX

Streptamine sulfate (hydrolysis of streptidine)

About 1.0 g. of streptidine hydrochloride was dissolved in 15 cc. of water in a Monel metal flask. One hundred cc. of saturated barium hydroxide solution was added, and the solution was refluxed in a stream of nitrogen for 23 hours. After leaving the hydrolysis solution, the nitrogen was passed through traps containing standard hydrochloric acid to absorb the ammonia liberated in the hydrolysis. Titration showed that at the end of the heating period there had been absorbed in the traps a total of 3.70 moles of ammonia per mole of streptidine. This is, within experimental error, approximately 4 moles per mole, which is the expected value. The hydrolysis solution was filtered away from the barium carbonate formed, and the barium carbonate was dissolved in dilute hydrochloric acid and converted to barium sulfate yielding 1.144 g. This corresponds to the formation of 1.82 moles of carbon dioxide per mole of streptidine during the hydrolysis. The molar ratio of ammonia evolved to carbon dioxide evolved in this hydrolysis is 2:1. Four moles of ammonia and two moles of carbon dioxide are expected to be produced in the complete hydrolysis for each mole of streptidine. The product left after the loss of ammonia and carbon dioxide from streptidine is called streptamine. Milder hydrolysis, for the period of one hour, yields only two moles of ammonia and no carbon dioxide. The product obtained under these conditions is the urea-type compound strepturea. Further hydrolysis of the latter yields, of course, streptamine, carbon dioxide, and ammonia.

The filtrate above obtained after removal of barium carbonate was then treated with that amount of standard sulfuric acid calculated to neutralize the barium hydroxide left in the filtrate. The barium sulfate was filtered off and the filtrate was frozen and dried from the frozen state under vacuum yielding 710 mg. of buff amorphous solid after further drying at 56° for about an hour. About 277 mg. of the residue thus obtained was ground up in about 5 cc. of water, whereupon needle crystals were formed. These were recrystallized from about 40 cc. of boiling water. After removal of a first crop of crystals, 158 mg., further crops could be obtained by addition of methanol to the mother liquors. The crystals did not show any melting point up to 300°. They represent the normal sulfate of streptamine, since analyses agree with this, and since the sulfate can be converted to hexaacetyl streptamine.

Anal. Calc. for $C_6H_{14}N_2O_4 \cdot H_2SO_4$: C, 26.12; H, 5.84; N, 10.14. Found: C, 26.36; H, 6.09; N, 9.91.

EXAMPLE X

Streptidine (free base)

About 246 mg. of streptidine sulfate dissolved in 40 cc. of hot water is treated with 3.28 cc. of 0.372 N barium hydroxide. The barium sulfate formed is removed by filtration and the aqueous filtrate is concentrated to dryness from the frozen state. Treatment of the residue with methanol yields a crystalline product and recrystallization from aqueous methanol yields about 105 mg. of the crystalline free base streptidine. This product, when heated on a micro-block sinters slightly at about 205° C., begins to decompose at about 225° C. and appears to decompose completely between 280–290° C.

EXAMPLE XI

Streptamine hydrochloride

A quality of streptamine sulfate is treated with a stoichiometric equivalent of barium chloride. A metathetical reaction takes place with the formation of a precipitate of barium sulfate which is filtered off. The filtrate is concentrated to dryness and a small amount of methanol is added. The addition of methanol causes formation of needle crystals of streptamine hydrochloride which after removal of the methanol and drying have a melting point of about 210–220° C. with decomposition.

EXAMPLE XII

Streptamine (free base)

About 1.24 g. of streptamine sulfate, $C_6H_{14}N_2O_4 \cdot H_2SO_4$ was suspended in 50 cc. of water and heated to boiling. A slow stream of nitrogen was kept passing over the surface of the hot suspension. To the boiling suspension was added 19.36 cc. of 0.465 N barium hydroxide. The suspension was kept boiling for about ten minutes in order to complete the metathetical reaction. After cooling, still in nitrogen atmosphere, the barium sulfate was filtered off and the filtrate was concentrated to about 10 cc. under reduced pressure with a stream of nitrogen being allowed to pass into the concentrating solution through a capillary. Crystallization began to occur at this point, so 5 cc. of carbon dioxide-free water was added to redissolve the crystals. The addition of about two volumes of ethanol caused rapid crystallization. Two crops of crystals, totalling about 600 mg., were collected. A further amount could be obtained from the mother liquors of the first two crops by conventional procedures. The crystals sintered slightly at 205°, began to decompose at about 210° (slight darkening) and were completely black at about 250° when heated on the micro-block. The crystals did not melt up to 290°, however.

Anal. Calcd. for $C_6H_{14}N_2O_4 \cdot \frac{1}{2}H_2O$: C, 38.49; H, 8.08; N, 14.97. Found: C, 38.65; H, 7.62; N, 15.43.

EXAMPLE XIII

Strepturea

About 371 mg. of streptidine hydrochloride were treated with 10 cc. of 0.3721 N barium hydroxide and refluxed for one hour in a stream of nitrogen. Then 4.83 cc. of 0.7711 N sulfuric acid was added to neutralize exactly the barium hydroxide, and the barium sulfate formed was removed by filtration. The filtrate was evaporated to dryness and extracted with methanol. The insoluble material, 210 mg., was then dissolved in about 5 cc. of hot water and allowed to cool slowly after adding about 8 cc. of methanol. Clusters of needles of strepturea separated on cooling. The crystals darkened at 270° and decomposed at about 290–300°. Strepturea appears to be a neutral substance.

Anal. Calcd. for $C_8H_{16}N_4O_6$: C, 36.36; H, 6.10; N, 21.20. Found: C, 35.85; H, 6.43; N, 20.60.

EXAMPLE XIV

Streptamine-p-hydroxyphenyl-azobenzene-p'-sulfonate

About 72 mg. of free streptamine was dissolved in 0.5 cc. of water and treated with 300 mg. of p-hydroxyphenyl-azobenzene-p'-sulfonic acid, whereupon a voluminous precipitate of needles separated. These were recrystallized from hot water. The crystals decompose at about 270–300° (micro-block). They were dried at 100° in vacuo for analysis.

Anal. Calcd. for $C_{30}H_{34}N_6O_{12}S_2$: C, 49.04; H, 4.67; N, 11.44. Found: C, 48.82; H, 4.67; N, 11.61.

EXAMPLE XV

Streptamine picrate

About 149 mg. of streptamine hydrochloride was refluxed for 6 hours in 12 cc. of methanol with about 54 mg. of cyanamide. The solution was evaporated to dryness, and dissolved in 10 cc. of water containing 300 mg. of picric acid (90%). On standing, the picrate crystallized out. The streptamine picrate after recrystallization from water melted at about 260–285° (micro-block).

Anal. Calcd. for $C_6H_{14}N_2O_4 \cdot 2C_6H_3N_3O_7$: C, 33.97; H, 3.17; N, 17.61. Found: C, 33.57; H, 3.42; N, 17.52.

EXAMPLE XVI

Streptamine hydroiodide

About 139 mg. of streptamine sulfate was heated in a bomb tube with 150 mg. of red phosphorus and 5 cc. of hydriodic acid (sp. g. 1.7) for 15 hours. The contents of the tube were diluted, filtered and the filtrate was concentrated to dryness. The residue was dissolved in methanol. Crystals of streptamine hydroiodide were deposited on addition of ether to the methanol solution. The crystals melted with decomposition at about 250–260° (micro-block).

Anal. Calcd. for $C_6H_{14}N_2O_4 \cdot 2HI$: C, 16.60; H, 3.72; N, 6.46; I, 58.48. Found: C, 15.09; H, 3.55; N, 6.68; I, 57.17.

EXAMPLE XVII

Hexaacetyl streptamine

About 81 mg. of streptamine sulfate, 50 mg. of fused sodium acetate, and 5 cc. of acetic anhydride were heated under reflux for one hour. At the end of this time the solution was evaporated to dryness in vacuo. The residue was extracted with chloroform yielding about 40 mg. of white needles soluble in chloroform. These crystals show a transition point at about 250–251° (micro-block) which appears to be a change of crystal form to long fine needles. At this temperature there is a semi-solid mixture of needles and semi-solid material which all appears to go over into the needle form by 285–295°. No true melting is observed up to 300°. This sample was recrystallized from chloroform solution by addition of ether, giving about 27 mg. of needles which showed the same melting point behavior. These crystals appear to be one isomer of hexaacetyl streptamine characterized by chloroform solubility.

Anal. Calcd. for $C_6H_8N_2O_4 \cdot 6CH_3CO$: C, 50.20; H, 6.09; N, 6.50; acetyl, 60.0. Found: C, 51.00; H, 6.05; N, 6.03; acetyl, 61.1.

From the chloroform insoluble residue left after extraction of the acetylation mixture with chloroform, there was separated about 90 mg. of long needles by suspending the residue in chloroform and mechanically separating the needles (dispersed in chloroform) from the sodium chloride (heavy crystals which rapidly settled to the bottom out of suspension). These crystals also showed a change in crystal form when heated, changing to long fine needles at about 240–247° (micro-block). These crystals did not melt up to 300° (micro-block). They were recrystallized from ethanol, giving 43 mg. of crystals with about the same melting point behavior. They appear to be an isomer of hexaacetyl streptamine characterized by chloroform insolubility.

Anal. Calcd. for $C_6H_8N_2O_4 \cdot 6CH_3CO$: C, 50.20; H, 6.09; N, 6.50; acetyl, 60.0. Found: C, 50.08; H, 6.10; N, 6.17; acetyl, 56.9.

EXAMPLE XVIII

N,N'-diacetyl streptamine

Hexaacetyl streptamine, about 38 mg., is dissolved in 10 cc. of absolute methanol, cooled to about 0°, and gaseous ammonia is passed into the solution until saturation occurs. The solution in a stoppered flask is then allowed to warm to room temperature and stand for three hours. The solvent is removed at reduced pressure at a low temperature. The crystalline residue left is recrystallized from methanol-ethanol mixture to yield crystals of N,N'-diacetyl streptamine which become opaque at about 175° and melt at about 286–288° (micro-block) with some decomposition.

A sample dried at 56° in vacuo gave the following analytical results: Calcd. for $C_6H_{12}N_2O_4 \cdot 2CH_3CO \cdot H_2O$ C, 42.85; H, 7.19; N, 10.00. Found: C, 42.91; H, 7.07; N, 10.07.

EXAMPLE XIX

Hexabenzoyl streptamine

About 744 mg. of streptamine hydrochloride was refluxed for 10 minutes with 6 ml. of dry pyridine and 3.5 ml. of benzoyl chloride. After cooling, the mixture was diluted with water and extracted with chloroform. The chloroform extract was washed with dilute hydrochloric acid, dilute sodium bicarbonate, and water. The chloroform extract after drying was evaporated to about a volume of about 15 ml. and mixed with three volumes of ether. Separation of a crystalline precipitate of hexabenzoyl streptamine was rapid. The crystals weighed 780 mg. and did not melt up to 300°.

Anal. Calcd. for $C_6H_8N_2O_4(C_6H_5CO)_6$: C, 71.81; H, 4.77; N, 3.49; benzoyl, 78.5. Found: C, 72.06; H, 5.03; N, 3.35; benzoyl, 70.5.

EXAMPLE XX

N,N'-dibenzoyl streptamine

About 250 mg. of hexabenzoyl streptamine was heated with 60 ml. of absolute methanol containing a trace of sodium methoxide and 5 ml. of pyridine to increase solubility of the hexabenzoate. After a short period of heating, the solid hexabenzoate was all dissolved and the solution was evaporated to dryness. The residue was dissolved in warm methanol, filtered, and diluted with water. On standing, long needle crystals separated. After two crystallizations the crystals of N,N'-dibenzoyl streptamine weighed 160 mg., M. P. 293–295° (micro-block). Further amounts could be obtained from the mother liquors. The sample was dried at 100° in vacuo for analysis.

Anal. Calcd. for $C_6H_{12}N_2O_4(C_6H_5CO)_2$: C, 62.16; H, 5.74; N, 7.25. Found: C, 61.79; H, 5.88; N, 7.21.

The recrystallization can also be carried out in acetone and in mixtures of methanol and ethanol.

The Schotten Baumann benzoylation technique used with streptamine hydrochloride gives a small yield of N,N'-dibenzoyl streptamine directly, M. P. 292–295° (micro-block).

Modifications may be made in carrying out the present invention without departing from the spirit and scope thereof and the invention is to be limited only by the appended claims.

I claim:

1. A substance of the class consisting of diamino, dicarbamido, and diguanido tetrahydroxy cyclohexanes and acid salts and acetyl and benzoyl derivatives thereof.

2. The diamino tetrahydroxy cyclohexane, streptamine.

3. The dicarbamido tetrahydroxy cyclohexane, strepturea.

4. The diguanido tetrahydroxy cyclohexane, streptidine.

5. The process that comprises treating streptomycin hydrochloride with a mineral acid in a solvent of the class consisting of water, lower aliphatic alcohols, and aqueous-lower aliphatic alcohol mixtures, thereby forming the diguanido tetrahydroxy cyclohexane, streptidine.

6. The process that comprises treating streptomycin hydrochloride with a mineral acid in a solvent of the class consisting of water, lower aliphatic alcohols, and aqueous-lower aliphatic alcohol mixtures, thereby forming the diguanido tetrahydroxy cyclohexane, streptidine, and recovering streptidine from the reaction mixture in the form of an acid salt.

7. The process that comprises treating streptomycin hydrochloride with a mineral acid at about 120° C., under pressure, for about two hours, in a solvent of the class consisting of water, lower aliphatic alcohols, and aqueous-lower aliphatic alcohol mixtures, thereby forming the diguanido tetrahydroxy cyclohexane, streptidine.

8. The process that comprises treating streptomycin hydrochloride with a mineral acid at room temperature for about 18 to 20 hours in a solvent of the class consisting of water, lower aliphatic alcohols, and aqueous-lower aliphatic alcohol mixtures, thereby forming the diguanido tetrahydroxy cyclohexane, streptidine.

9. The diguanido tetrahydroxy cyclohexane dihydrochloride, streptidine hydrochloride.

10. The diamino tetrahydroxy cyclohexane dihydrochloride, streptamine hydrochloride.

ROBERT L. PECK.

REFERENCES CITED

The following references are of record in the file of this patent:

Schatz et al.: Proc. Soc. Exptl. Biol. and Med., Jan. 1944, pp. 66–69.

Carter et al.: J. Biol. Chem., vol. 160, Sept. 1945, page 339.

Carter et al.: Science, vol. 103, Jan. 1946, page 53.